US010442922B2

(12) United States Patent
Fudemoto et al.

(10) Patent No.: US 10,442,922 B2
(45) Date of Patent: Oct. 15, 2019

(54) TIRE

(71) Applicant: BRIDGESTONE CORPORATION, Tokyo (JP)

(72) Inventors: Hiroyuki Fudemoto, Tokyo (JP); Soichi Kyo, Tokyo (JP); Atsuko Honjyo, Tokyo (JP); Takahiro Suzuki, Tokyo (JP); Naoyuki Sone, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/547,845

(22) PCT Filed: Feb. 4, 2016

(86) PCT No.: PCT/JP2016/053427
§ 371 (c)(1),
(2) Date: Aug. 1, 2017

(87) PCT Pub. No.: WO2016/125873
PCT Pub. Date: Aug. 11, 2016

(65) Prior Publication Data
US 2018/0016427 A1 Jan. 18, 2018

(30) Foreign Application Priority Data

Feb. 4, 2015 (JP) ................. 2015-020549
Feb. 4, 2015 (JP) ................. 2015-020562

(51) Int. Cl.
*C08L 23/12* (2006.01)
*B60C 1/00* (2006.01)
*C08L 53/00* (2006.01)
*B29D 30/38* (2006.01)
*B29D 30/06* (2006.01)
*C08L 23/08* (2006.01)
*B29K 23/00* (2006.01)

(52) U.S. Cl.
CPC ............... *C08L 23/12* (2013.01); *B60C 1/00* (2013.01); *B60C 1/0041* (2013.01); *C08L 23/08* (2013.01); *C08L 53/00* (2013.01); *B29D 30/06* (2013.01); *B29D 30/38* (2013.01); *B29K 2023/12* (2013.01); *C08L 2205/025* (2013.01); *C08L 2205/03* (2013.01); *C08L 2207/066* (2013.01)

(58) Field of Classification Search
CPC .... C08L 23/08; C08L 23/12; C08L 2205/025; C08L 53/00
See application file for complete search history.

(56) References Cited

U.S. PATENT DOCUMENTS

| 5,238,989 | A | * | 8/1993 | Takei ...................... C08K 3/34 524/449 |
| 5,919,864 | A | | 7/1999 | Watanabe et al. |
| 2005/0228107 | A1 | | 10/2005 | Lin et al. |
| 2012/0285597 | A1 | | 11/2012 | Abad et al. |
| 2013/0206301 | A1 | | 8/2013 | Fudemoto et al. |
| 2016/0001598 | A1 | | 1/2016 | Ito |
| 2016/0046764 | A1 | | 2/2016 | Fudemoto et al. |
| 2016/0303905 | A1 | | 10/2016 | Fudemoto et al. |
| 2018/0015784 | A1 | | 1/2018 | Kyo et al. |

FOREIGN PATENT DOCUMENTS

| CN | 1505567 A | 6/2004 |
| EP | 0 425 299 A2 | 5/1991 |
| EP | 2 821 254 A1 | 1/2015 |
| JP | 57151405 A | 9/1982 |
| JP | 03-143701 A | 6/1991 |
| JP | 2012-046029 A | 3/2012 |
| JP | 2012-046031 A | 3/2012 |
| JP | 2012-106668 A | 6/2012 |
| JP | 2013-515801 A | 5/2013 |
| WO | 99/48973 A1 | 9/1999 |
| WO | 2014/133105 A1 | 9/2014 |

OTHER PUBLICATIONS

Extended European Search Report dated Jan. 31, 2018 issued by the European Patent Office in counterpart European Application No. 16746704.2.
International Search Report of PCT/JP2016/053427 dated Mar. 15, 2016.
Communication dated May 20, 2019, from the State Intellectual Property Office of the P.R.C in counterpart application No. 201680008495X.

* cited by examiner

Primary Examiner — Christopher M Rodd
(74) *Attorney, Agent, or Firm* — Sughrue Mion, PLLC (57) ABSTRACT

A tire having a circular tire frame formed of a resin material, the resin material including an olefin-based resin composition and having a tensile elastic modulus as defined in JIS K7113 (1995) of from 140 MPa to 570 MPa and an amount of creep as defined in JIS K7115 (1999) of 50 mm or less, and a degree of crystallinity of the polypropylene-based resin being from 24.5% to 32.7%.

22 Claims, 4 Drawing Sheets

TIRE

CROSS REFERENCE TO RELATED APPLICATIONS

This application is a National Stage of International Application No. PCT/JP2016/053427 filed Feb. 4, 2016, claiming priority based on Japanese Patent Application No. 2015-020562 filed Feb. 4, 2015 and Japanese Patent Application No. 2015-020549 filed Feb. 4, 2015, the contents of all of which are incorporated herein by reference in their entirety.

TECHNICAL FIELD

The present invention relates to a tire to be fitted to a rim and, in particular, to a tire in which at least a portion of a tire case is formed of a resin material.

BACKGROUND ART

Conventionally, pneumatic tires constructed from rubber, organic fiber materials, steel members, and the like have been used in vehicles such as passenger cars. Regarding general rubber materials that are used for conventional pneumatic tires, there are no problems in terms of heat resistance and the like. However, the process for manufacturing a tire usually includes plural steps, for example, kneading, sheeting, molding, and vulcanization, and therefore, improvement in productivity has been required.

In regard to the above, recently, from the viewpoints of weight reduction, ease of molding, and ease of recycling, research has been conducted on the use of resin materials as the tire material; in particular, thermoplastic resins, thermoplastic elastomers, and the like. These thermoplastic polymer materials (thermoplastic resin materials) have many advantages from the viewpoint of improvement in productivity, such as by enabling injection molding.

Further, a tire in which a polyolefine-based thermoplastic elastomer is used as the thermoplastic polymer material has been proposed (see Patent Document 1: Japanese Patent Application Laid-Open (JP-A) No. 2012-046031]).

SUMMARY OF INVENTION

Technical Problem

Tires, in which a thermoplastic resin material is used, are easily produced and inexpensive, compared to conventional tires made of rubber. However, in the case of manufacturing tires using a resin material, realization of performance that compares favorably to conventional tires made of rubber, while also realizing this high manufacturing efficiency and low cost, is required. Specifically, it is required to ensure excellent fittability onto a rim, such that the tire can be assembled onto a rim and such that the air in the inner part does not leak when the tire is assembled onto a rim. As a tire capable of achieving this fittability onto a rim, for example, a tire in which an amide-based resin composition is used in the tire frame has been tested. In addition, a property of not causing deformation of the tire itself during traveling (resistance to deformation during traveling) is also required.

However, it is understood that, in the case of using an olefin-based resin (a polypropylene-based resin or the like), which is advantageous especially in terms of realizing low cost among resin materials, it is not easy to realize resistance to deformation during traveling, while also obtaining fittability onto a rim.

As a material capable of realizing lower cost as compared with an amide-based resin composition, an olefin-based resin composition has been tested. However, it is understood that, in a tire frame containing an olefin-based resin composition, it is not easy to achieve both the fittability onto a rim and the resistance to deformation during traveling (a property of not causing deformation of the tire itself during traveling), which had not been recognized as a problem in a tire frame containing an amide-based resin composition.

Accordingly, the invention has been made based on the above circumstances, and an object of the invention is to provide a tire which is formed using a resin material that contains an olefin-based resin composition of a polypropylene-based resin or the like, and which exhibits excellent resistance to deformation during traveling, while realizing favorable fittability onto a rim.

Solution to Problem

[1] A tire having a circular tire frame formed from a resin material, in which the resin material includes an olefin-based resin composition and has a tensile elastic modulus as defined in JIS K7113 (1995) of from 140 MPa to 570 MPa and an amount of creep as defined in JIS K7115 (1999) of 50 mm or less.

[2] The tire according to [1], wherein the resin material includes at least a polypropylene-based resin, a degree of crystallinity of the polypropylene-based resin being from 24.5% to 32.7%.

[3] The tire according to [2], wherein a content of the polypropylene-based resin in the resin material is higher than 60% by mass.

[4] The tire according to [2] or [3], wherein a melting temperature of the polypropylene-based resin is 160° C. or higher.

[5] The tire according to any one of [2] to [4], wherein the polypropylene-based resin is a mixture including a first polypropylene-based resin and a second polypropylene-based resin that is different from the first polypropylene-based resin.

[6] The tire according to [5], wherein the mixture is a substance in which the second polypropylene-based resin is dispersed as a dispersed phase in a continuous phase including the first polypropylene-based resin.

[7] The tire according to [5] or [6], wherein a proportion of the constituent units derived from propylene with respect to the total of the constituent units that constitute the main chain of the second polypropylene-based resin is from 50% by mass to 100% by mass.

[8] The tire according to any one of [5] to [7], wherein a content of the second polypropylene-based resin with respect to the total amount of the first polypropylene-based resin and the second polypropylene-based resin is from 34% by mass to 50% by mass.

[9] The tire according to [1], wherein the olefin-based resin composition is an ethylene-based resin composition.

[10] The tire according to [9], wherein a weight average molecular weight of the ethylene-based resin composition is from 100,000 to 300,000.

[11] The tire according to [10], wherein the weight average molecular weight of the ethylene-based resin composition is from 180,000 to 300,000.

[12] The tire according to any one of [1], or [9] to [11], wherein the resin material contains the olefin-based resin composition at a content of higher than 50% by mass.

Advantageous Effects of Invention

According to the invention, a tire which is formed using a resin material containing an olefin-based resin (a polypropylene-based resin or the like) composition and which exhibits excellent resistance to deformation during traveling, while realizing favorable fittability onto a rim may be provided.

DESCRIPTION OF EMBODIMENTS

The tire of the invention has a circular tire frame formed of a resin material including a resin. The resin material includes at least an olefin-based resin composition and the resin material has a tensile elastic modulus as defined in JIS K7113 (1995) of from 140 MPa to 570 MPa and an amount of creep as defined in JIS K7115 (1999) of 50 mm or less.

In the tire of the invention, the resin includes at least an olefin-based resin such as a polypropylene-based resin or the like, and the degree of crystallinity of the polypropylene-based resin is from 24.5% to 32.7%.

Here, in the invention, the term "polypropylene-based resin" refers to a polymer obtained by polymerization using one or more monomers including at least propylene, and specifically, encompasses a homopolymer of propylene, a copolymer of propylene and a monomer other than propylene, and a mixture thereof. In the present specification, the concept of the term "resin" encompasses thermoplastic resins and thermosetting resins, but does not encompass rubbers.

Further, in the present specification, a numeral range expressed using "to" means a range including numerical values described in front of and behind "to" as the lower limit value and the upper limit value.

Recently, research has been conducted on the use of resin materials as the tire material, because of its advantages in terms of manufacturing efficiency and low cost. For example, a tire in which an amide-based resin composition or the like is used in the tire frame has been tested. Further, as a material capable of realizing lower cost as compared with the amide-based resin composition, an olefin-based resin composition of a propylene-based resin or the like has also been tested.

As described above, tires in which a resin material is used are required to have the same performance as that of conventional tires made of rubber. For example, it is required to have excellent fittability onto a rim, such that the air in the inner part does not leak when the tire is assembled onto a rim. In addition, when a load is continuously applied through traveling, deformation of the tire frame itself may be caused, resulting in being inferior in traveling performance, and moreover, in a case in which this deformation proceeds further, leakage of the air in the inner part may occur, and therefore, a property of not causing deformation of the tire itself during traveling (resistance to deformation during traveling) is also required.

However, it is understood that, in the tire frame containing an olefin-based resin composition, when trying to realize fittability onto a rim, it is not easy to achieve the resistance to deformation as well. This problem regarding the resistance to deformation has not been recognized as a problem in the tire frame in which an amide-based resin composition is used, and it is understood that this problem is a problem peculiar to the tire frame containing an olefin-based resin composition.

In response to the above, in the invention, the tensile elastic modulus and amount of creep of the resin material that forms the tire frame are within the ranges described above.

When the tensile elastic modulus is within the range described above, the elasticity of the tire is controlled to be within the proper range and an excellent fittability onto a rim is obtained, as a result of which, the tire is favorably assembled onto a rim and thus, leakage of the air in the inner part is suppressed.

Further, in the invention, the resin incorporated in the resin material that forms the tire frame includes at least a polypropylene-based resin, and the degree of crystallinity of the polypropylene-based resin is in a range of from 24.5% to 32.7%.

It is thought that, when the degree of crystallinity of the polypropylene-based resin is within the above range, the creeping property of the tire frame can be reduced while obtaining an appropriate elastic modulus as a tire frame.

When the elastic modulus is within an appropriate range, an excellent fittability onto a rim is obtained, as a result of which, the tire is favorably assembled onto a rim and thus, the leakage of the air in the inner part is suppressed.

On the other hand, it is guessed that, when the amount of creep is within the above range, or when the creeping property is reduced, even in a case in which a load is continuously applied to the tire through traveling, deformation of the tire frame itself, especially, deformation of the side face of the tire, is suppressed, resulting in achieving excellent resistance to deformation during traveling. By suppressing the deformation of the tire frame itself, leakage of air that may occur in conjugation with the deformation is suppressed.

From the reasons described above, it is guessed that the tire of the invention can realize both favorable fittability onto a rim and resistance to deformation during traveling.

Hereinafter, the resin material that forms the tire frame is explained.

—Tensile Elastic Modulus—

The tensile elastic modulus of the resin material in the invention indicates a tensile elastic modulus which is measured in accordance with JIS K7113 (1995).

The tensile elastic modulus of the resin material is in a range of from 140 MPa to 570 MPa, and preferably in a range of from 160 MPa to 500 MPa. When the tensile elastic modulus is lower than 140 MPa, the shape of the tire frame cannot be maintained favorably. Meanwhile, when the tensile elastic modulus exceeds 570 MPa, fitting onto a rim cannot be carried out efficiently, and leakage of the air in the inner part may occur. Further, when the elastic modulus is 160 MPa or higher, deterioration of ride quality due to deformation resulting from the distortion can be prevented. When the tensile elastic modulus is 500 MPa or lower, deterioration of ride quality resulting from the hardness can be prevented.

—Amount of Creep—

The amount of creep of the resin material in the invention refers to the amount of creep after three hours, which is measured in accordance with JIS K7115 (1999), using a JIS No. 3 Dumbbell test specimen, under the conditions of a distance between the chucks of 65 mm, 40N, and 90° C.

The amount of creep of the resin material is in a range of 50 mm or less, and the value closer to 0 mm, the more preferable. When the amount of creep exceeds 50 mm, in a case in which a load is continuously applied to the tire through traveling, deformation of the tire frame itself is caused, and particularly, deformation at the side face of the tire is likely to be caused. Moreover, in a case in which this deformation of the tire frame itself proceeds further, leakage of the air in the inner part occurs.

Here, the tensile elastic modulus and the amount of creep are physical property values of the resin material, that is, physical property values of the tire frame to be formed of the resin material. Accordingly, even in a case in which the tire frame is formed of a resin material including, in addition to an olefin-based resin composition, other resin composition, or in a case in which the tire frame is formed of a resin material including other additive other than the resin or the like, the tensile elastic modulus and the amount of creep indicate the physical properties of the resin material including all these components.

The tensile elastic modulus and the amount of creep in the resin material can be adjusted mainly by selecting the kind of resin incorporated in the resin material. Namely, in a case in which the resin material includes, as a resin, only one kind of olefin-based resin composition, the tensile elastic modulus and the amount of creep are adjusted by selecting the kind of the olefin-based resin composition. In a case in which the resin material includes, as a resin, two or more kinds of resins (at least one of them is an olefin-based resin composition), the tensile elastic modulus and the amount of creep are adjusted according to the combination of the two or more kinds of resins. Further, the tensile elastic modulus and the amount of creep may also be adjusted by adding other additive other than the resin, or the like.

<<Resin Material>>

The tire according to the invention has a tire frame formed by using a resin material.

It is preferable that the resin material contains an olefin-based resin composition at a content exceeding 50% by mass.

Further, in one embodiment, the tire of the invention has a tire frame formed by using a resin material that contains a polypropylene-based resin having a degree of crystallinity of from 24.5% to 32.7%.

The resin containing an olefin-based resin composition of a polypropylene-based resin or the like may contain, if necessary, a resin other than the olefin-based resin, as long as the effects of the invention are not impaired. However, the content percentage of the olefin-based resin with respect to the whole resin is preferably 60% by mass or higher, more preferably 80% by mass or higher, still more preferably 90% by mass or higher, and particularly preferably 95% by mass.

Here, in the present specification, the concept of the term "resin" encompasses thermoplastic resins and thermosetting resins, but does not encompass natural rubbers.

Further, the resin material may contain, if necessary, one or more components (for example, additives or the like) other than the resin, as long as the effects of the invention are not impaired. However, the content percentage of the olefin-based resin composition of a polypropylene-based resin or the like with respect to the whole resin material is preferably higher than 60% by mass, more preferably 80% by mass or higher, and still more preferably 90% by mass or higher.

(Olefin-Based Resin Composition)

The olefin-based resin composition is a resin composition in which at least the polyolefin has crystallinity and the polyolefin constitutes the main body of the resin. Examples include a polyolefin-based thermoplastic elastomer (TPO) as defined in JIS K6418 (2007), polyethylene, polypropylene, an isotactic polypropylene, and polybutene.

Examples of the olefin-based resin composition include an olefin/α-olefin copolymer, an olefin copolymer, and the like. Specific examples include the following polymers.

Polyethylene
Ethylene/propylene copolymer
Ethylene/hexene copolymer
Ethylene/pentene copolymer
Ethylene/octene copolymer
Propylene/1-hexene copolymer
Ethylene/4-methyl-pentene copolymer
Propylene/4-methyl-1-pentene copolymer
Ethylene/butene copolymer
Propylene/butene copolymer
1-Butene/hexene copolymer
1-Butene/4-methyl-pentene copolymer
Ethylene/methacrylic acid copolymer
Ethylene/methyl methacrylate copolymer
Ethylene/ethyl methacrylate copolymer
Ethylene/butyl methacrylate copolymer
Ethylene/methyl acrylate copolymer
Ethylene/ethyl acrylate copolymer
Ethylene/butyl acrylate copolymer
Ethylene/vinyl acetate copolymer
Propylene/methacrylic acid copolymer
Propylene/methyl methacrylate copolymer
Propylene/ethyl methacrylate copolymer
Propylene/butyl methacrylate copolymer
Propylene/methyl acrylate copolymer
Propylene/ethyl acrylate copolymer
Propylene/butyl acrylate copolymer
Propylene/vinyl acetate copolymer The olefin-based resin composition is more preferably an ethylene-based resin composition. By using an ethylene-based resin composition, a tire frame more excellent in impact resistance can be obtained. Examples of the ethylene-based resin composition include the following polymers.

Polyethylene
Ethylene/propylene copolymer
Ethylene/hexene copolymer
Ethylene/pentene copolymer
Ethylene/octene copolymer
Ethylene/4-methyl-pentene copolymer
Ethylene/butene copolymer
Ethylene/methacrylic acid copolymer
Ethylene/methyl methacrylate copolymer
Ethylene/ethyl methacrylate copolymer
Ethylene/butyl methacrylate copolymer
Ethylene/methyl acrylate copolymer
Ethylene/ethyl acrylate copolymer
Ethylene/butyl acrylate copolymer
Ethylene/vinyl acetate copolymer Among these ethylene-based resin compositions, the following polymers are more preferable.
Ethylene/propylene copolymer
Ethylene/butene copolymer
Ethylene/pentene copolymer
Ethylene/hexene copolymer
Ethylene/octene copolymer Here, the degree of crystallinity of the olefin-based resin composition of a polypropylene-based resin or the like is a value obtained as follows.

Specifically, a specimen in a pellet form is prepared using the resin material as it is. Then, using a differential scanning calorimetric analysis (DSC) device [trade name: Q2000, manufactured by TA Instruments], the heat quantity of fusion is measured while elevating the temperature of the pellet shaped specimen from −60° C. to 220° C. at a temperature elevating rate of 10° C./min. From the theoretical value of the heat quantity of fusion in the perfect crystal of the olefin-based resin composition of a polypropylene-based resin or the like and the value of the content of the olefin-based resin composition of a polypropylene-based resin or the like contained in the pellet shaped specimen, the degree of crystallinity is calculated.

An example of the polypropylene-based resin having a degree of crystallinity within the above range is a mixture of two or more kinds of polypropylene-based resins. Specifically, an example of the mixture of two or more kinds of polypropylene-based resins is a mixture of a first polypropylene-based resin and a second polypropylene-based resin that is different from the first polypropylene-based resin in terms of molecular structure and/or stereoregularity.

Hereinafter, the mixture of a first polypropylene-based resin and a second polypropylene-based resin (hereinafter referred to as, simply, "mixture" in some cases) is explained in detail.

<Mixture of First Polypropylene-Based Resin and Second Polypropylene-Based Resin>

First Polypropylene-Based Resin

An example of the first polypropylene-based resin is a crystalline polypropylene-based resin.

Specific examples of the first polypropylene-based resin include homopolymers of propylene (hereinafter referred to as "homo polypropylenes" in some cases). Above all, from the viewpoint of adjusting the degree of crystallinity to be within the above range and realizing both favorable fittability onto a rim and resistance to deformation during traveling, a homo polypropylene having stereoregularity is preferable. Examples of the homo polypropylene having stereoregularity include an isotactic polypropylene, a syndiotactic polypropylene, and the like. Among them, from the viewpoint of realizing both favorable fittability onto a rim and resistance to deformation during traveling, an isotactic polypropylene is further preferable.

The homo polypropylene having stereoregularity, such as an isotactic polypropylene or a syndiotactic polypropylene, can be synthesized according to known methods.

The number average molecular weight of the olefin-based resin composition is preferably from 10,000 to 500,000.

The content percentage of polyolefin in the olefin-based resin composition is preferably from 40% by mass to 100% by mass, and more preferably from 50% by mass to 100% by mass.

The weight average molecular weight of the olefin-based resin composition is preferably from 50,000 to 3,000,000. From the viewpoint of adjusting the degree of crystallinity to be within the above range and realizing both favorable fittability onto a rim and resistance to deformation during traveling, the weight average molecular weight of the olefin-based resin composition is more preferably from 50,000 to 2,500,000, and still more preferably from 50,000 to 2,000,000. When the weight average molecular weight of the olefin-based resin composition is within the above range, the resin material has sufficient mechanical properties and is excellent in workability.

Further, the weight average molecular weight of the ethylene-based resin composition is preferably from 100,000 to 300,000. When the weight average molecular weight is within the above range, it is easy to adjust the tensile elastic modulus and amount of creep of the resin material to be within the ranges described above. Particularly, in a case in which only one kind of ethylene-based resin composition is used (without using other resin in combination) as the resin incorporated in the resin material according to the invention, the above adjustment becomes easier. From the same viewpoint, the weight average molecular weight is more preferably from 180,000 to 300,000.

The weight average molecular weight of the olefin-based resin composition can be measured by gel permeation chromatography (GPC) and, for example, a GPC (gel permeation chromatography) such as "HLC-8321GPC/HT" (trade name, manufactured by Tosoh Corporation) can be used.

The olefin-based resin composition can be synthesized by copolymerization according to known methods.

Acid Modification of Olefin-Based Resin Composition

An olefin-based resin composition having an acidic group (an acid modified olefin-based resin composition) can also be used as the olefin-based resin composition incorporated in the resin material.

When a tire frame is formed by using the acid modified olefin-based resin composition, in a case in which a reinforcing cord is directly wound on the outer circumferential part of the tire frame or in a case in which a reinforcing cord layer is formed such that the reinforcing cord is embedded in the outer circumferential part of the tire frame, the adhesion with respect to the reinforcing cord can be improved.

From the viewpoint of suppressing degradation of the resin material, examples of the acidic group possessed by the acid modified olefin-based resin composition include a carboxyl group which is a weak acid group, a sulfonic acid group, and a phosphoric acid group. A carboxyl group is particularly preferable.

Here, the term "acid modification" refers to binding an unsaturated compound having an acidic group, such as a carboxyl group, a sulfonic acid group, or a phosphoric acid group, to the olefin-based resin composition. For example, when an unsaturated carboxylic acid (generally, maleic anhydride) is used as the unsaturated compound having an acidic group, the unsaturated bonding site of the unsaturated carboxylic acid is bonded to the olefin-based resin composition (for example, graft polymerization).

Normally, acid modification of the olefin-based resin composition can be carried out by performing kneading and graft copolymerization of the olefin-based resin composition, an unsaturated compound having an acidic group (for example, an unsaturated carboxylic acid), and an organic peroxide, using a twin-screw extruder or the like. The addition amount of the unsaturated compound having an acidic group is preferably from 0.01 parts by mass to 20 parts by mass, and more preferably from 0.01 parts by mass to 10 parts by mass, with respect to 100 parts by mass of the olefin-based resin composition.

When the addition amount of the unsaturated compound having an acidic group is too small, the amount of grafting to the olefin-based resin composition decreases. When the addition amount is too much, the amount of unreacted unsaturated carboxylic acid in the resin increases, a sufficient strength of bonding cannot be obtained, and workability is deteriorated.

Regarding the addition amount of the organic peroxide, it is only required that an amount sufficient for performing a graft reaction is added. For example, the addition amount of the organic peroxide is preferably from 0.01 parts by mass to 5 parts by mass, and more preferably from 0.03 parts by mass to 1 part by mass.

Examples of the organic peroxide include 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropyl monocarbonate, t-butylperoxy-3,5,5-trimethyl hexanoate, t-butylperoxy laurate, 2,5-dimethyl-2,5-di(benzoylperoxy)hexane, t-butylperoxy acetate, 2,2-bis (t-butylperoxy)butene, t-butylperoxy benzoate, n-butyl-4,4-bis (t-peroxy) valerate, di-t-butylperoxy isophthalate, dicumyl peroxide, α,α'-bis(t-butylperoxy-m-isopropyl)benzene, 2,5-dimethyl-2,5-di(t-butylperoxy)hexane, 1,3-bis(t-butyl peroxydiisopropyl)benzene, t-butyl cumyl peroxide, di-t-butyl peroxide, p-menthane hydroperoxide, 2,5-dimethyl-2,5-di(t-butylperoxy)hexyne-3, di-3-methoxybutyl peroxydicarbonate, di-2-ethylhexyl peroxydicarbonate, bis (4-t-butylcyclohexyl) peroxydicarbonate, diisopropyl peroxydicarbonate, t-butylperoxyisopropyl carbonate, dimyristylperoxy carbonate, 1,1,3,3-tetramethylbutyl neodecanoate, α-cumyl peroxyneodecanoate, and t-butyl peroxyneodecanoate. These organic peroxides may be used singly, or two or more kinds thereof may be used in combination.

Examples of the acid modified olefin-based resin composition include those obtained by graft polymerization of the olefin-based resin composition with acrylic acid, methacrylic acid, itaconic acid, crotonic acid, isocrotonic acid, maleic acid, or the like. Particularly, it is preferable to use maleic anhydride.

As the olefin-based resin composition, commercially available products such as "TAFMER (registered trademark)" series, manufactured by Mitsui Chemicals, Inc., "ADMER (registered trademark)" series, manufactured by Mitsui Chemicals, Inc., "NUCREL" series, manufactured by Du Pont-Mitsui Polychemicals Co., Ltd., "ELVALOY AC" series, manufactured by Du Pont-Mitsui Polychemicals Co., Ltd., "ACRYFT (registered trademark)" series, manufactured by Sumitomo Chemical Co., Ltd., "EVATATE" series, manufactured by Sumitomo Chemical Co., Ltd., "ULTRASEN (registered trademark)" series, manufactured by Tosoh Corporation., "PRIME TPO (registered trademark)" series, manufactured by Prime Polymer Co., Ltd., "PRIME POLYPRO" series, manufactured by Prime Polymer Co., Ltd., "UMERIT (registered trademark)" series, manufactured by Ube-Maruzen Polyethylene Co., Ltd., "NOVATEC (registered trademark)" series, manufactured by Japan Polyethylene Corporation, or "NOVATEC (registered trademark)" series, manufactured by Japan Polypropylene Corporation may be used. For example, by using one kind or two or more kinds of these products and selecting the kind thereof, the tensile elastic modulus and amount of creep of the resin material are adjusted to be within the ranges described above.

The Shore D hardness of the first polypropylene-based resin is preferably higher than 70, from the viewpoint of adjusting the degree of crystallinity to be within the above range and realizing both favorable fittability onto a rim and resistance to deformation during traveling.

Here, the Shore D hardness of the resin is a value measured in accordance with JIS K7215 (1986).

The first polypropylene-based resin is preferably a crystalline polypropylene-based resin.

Second Polypropylene-Based Resin

The second polypropylene-based resin is not particularly limited as far as the second polypropylene-based resin is a polypropylene-based resin that is different from the first polypropylene-based resin in terms of molecular structure and/or stereoregularity.

Examples of the second polypropylene-based resin include non-crystalline polypropylene-based resins.

Specific examples of the second polypropylene-based resin include a homo polypropylene that does not have stereoregularity, a copolymer of propylene and a monomer other than propylene, and the like.

Hereinafter, a monomer other than propylene may be referred to as an "additional monomer", and a copolymer of propylene and an additional monomer may be referred to as, simply, a "copolymer".

Examples of the homo polypropylene that does not have stereoregularity include an atactic polypropylene and the like.

Examples of the additional monomer that constitutes the copolymer is not particularly limited as far as the monomer can form a copolymer with propylene. Specific examples thereof include ethylene, 1-butene, 1-pentene, 4-methyl-1-pentene, 1-hexene, acrylic acid, methacrylic acid, methyl acrylate, methyl methacrylate, ethyl acrylate, ethyl methacrylate, butyl acrylate, butyl methacrylate, and vinyl acetate. The copolymer may be a copolymer of propylene and only one kind of additional monomer, or may be a copolymer of propylene and two or more kinds of additional monomers.

Specific examples of the copolymer include a propylene/ethylene copolymer, a propylene/1-butene copolymer, a propylene/ethylene/1-butene copolymer, a propylene/1-hexene copolymer, a propylene/4-methyl-1-pentene copolymer, a propylene/methacrylic acid copolymer, a propylene/methyl methacrylate copolymer, a propylene/ethyl methacrylate copolymer, a propylene/butyl methacrylate copolymer, a propylene/methyl acrylate copolymer, a propylene/ethyl acrylate copolymer, a propylene/butyl acrylate copolymer, and a propylene/vinyl acetate copolymer.

Above all, as the copolymer, particularly, from the viewpoint of adjusting the degree of crystallinity to be within the above range and realizing both favorable fittability onto a rim and resistance to deformation during traveling, a copolymer of propylene and an α-olefin other than propylene is preferable. A propylene/ethylene copolymer, a propylene/1-butene copolymer, and a propylene/ethylene/1-butene copolymer are more preferable, and a propylene/ethylene/1-butene copolymer is particularly preferable.

Further, examples of the copolymer include a random copolymer, a block copolymer, and the like. The copolymer may also be a graft polymer. From the viewpoint of adjusting the degree of crystallinity to be within the above range and realizing both favorable fittability onto a rim and resistance to deformation during traveling, the copolymer is preferably a block copolymer.

The proportion of the constituent units derived from propylene to the total of the constituent units that constitute the main chain of the second polypropylene-based resin is preferably from 50% by mass to 100% by mass, more preferably from 60% by mass to 100% by mass, and still more preferably from 70% by mass to 100% by mass, from the viewpoint of adjusting the degree of crystallinity to be within the above range and realizing both favorable fittability onto a rim and resistance to deformation during traveling.

Here, the term "main chain" means the chain that becomes the longest trunk in the polymer molecular structure. The proportion of the constituent units derived from propylene is a proportion relative to the "total of the constituent units that constitute the main chain of the second polypropylene-based resin". For example, in a case in which the second polypropylene-based resin has side chains like a graft polymer, the constituent units that constitute the side chains are not taken into consideration and, among only the constituent units that constitute the main chain, at what proportion the constituent units derived from propylene are included is taken as the "proportion of the constituent units derived from propylene".

In a case in which the second polypropylene-based resin is an atactic polypropylene, the proportion of the constituent units derived from propylene is preferably 90% or higher, particularly preferably 95%, and further preferably 100% by mass.

In a case in which the second polypropylene-based resin is a propylene/ethylene/1-butene copolymer, the proportion of the constituent units derived from 1-butene to the total of the constituent units that constitute the main chain of the copolymer is preferably from 5% by mass to 40% by mass, and more preferably 10% by mass to 25% by mass.

The homo polypropylenes that do not have steroregularity, such as an atactic polypropylene, and the copolymers can be synthesized according to known methods.

The weight average molecular weight of the second polypropylene-based resin is from 500 to 2,000,000. From the viewpoint of adjusting the degree of crystallinity to be within the above range and realizing both favorable fittability onto a rim and resistance to deformation during traveling, the weight average molecular weight of the second polypropylene-based resin is preferably from 500 to 1,000,000 and more preferably from 500 to 700,000.

Here, the weight average molecular weight of the resin can be measured by gel permeation chromatography (GPC) and, for example, a GPC (gel permeation chromatography) such as "HLC-8320GPC ECO SEC" (trade name, manufactured by Tosoh Corporation) can be used.

The Shore D hardness of the second polypropylene-based resin is preferably from 50 to 70, from the viewpoint of adjusting the degree of crystallinity to be within the above range and realizing both favorable fittability onto a rim and resistance to deformation during traveling.

Here, the Shore D hardness of the resin is a value measured in accordance with JIS K7215 (1986).

Mixture

Preferable examples of a combination of the first polypropylene-based resin and the second polypropylene-based resin include a combination of an isotactic polypropylene and a copolymer, a combination of an isotactic polypropylene and an atactic polypropylene, and the like. Above all, a combination of an isotactic polypropylene and a propylene/α-olefin copolymer and a combination of an isotactic polypropylene and an atactic polypropylene are preferable, and a combination of an isotactic polypropylene and a propylene/ethylene/1-butene copolymer and a combination of an isotactic polypropylene and an atactic polypropylene are more preferable.

The content percentage of the second polypropylene-based resin with respect to the whole polypropylene-based resin, which is a mixture, (for example, the total amount of the first polypropylene-based resin and the second polypropylene-based resin) is preferably from 34% by mass to 50% by mass, from the viewpoint of adjusting the degree of crystallinity to be within the above range and realizing both favorable fittability onto a rim and resistance to deformation during traveling.

It is preferable that the mixture is a substance in which the second polypropylene-based resin is dispersed as a dispersed phase in a continuous phase including the first polypropylene-based resin, from the viewpoint of adjusting the degree of crystallinity to be within the above range and realizing both favorable fittability onto a rim and resistance to deformation during traveling. An example of the substance in which the second polypropylene-based resin is dispersed as a dispersed phase in a continuous phase including the first polypropylene-based resin is a substance having a sea-island structure including a sea part (continuous phase) formed of the first polypropylene-based resin and an island part (dispersed phase) formed of the second polypropylene-based resin.

Note that, since each of the first polypropylene-based resin and the second polypropylene-based resin has a constituent unit derived from propylene, the first polypropylene-based resin and the second polypropylene-based resin have high affinity with each other. Therefore, the tire formed of a resin material that contains a mixture of the first polypropylene-based resin and the second polypropylene-based resin has a higher impact resistance, as compared with the case of using, for example, a resin that does not have a constituent unit derived from propylene, instead of using the second polypropylene-based resin.

In the above, the use of a mixture of the first polypropylene-based resin and the second polypropylene-based resin, as the polypropylene-based resin having a degree of crystallinity within the above range, is explained; however, it is only required that the degree of crystallinity of the polypropylene-based resin is within the above range, and the invention is not limited thereto. Specifically, for example, as far as the degree of crystallinity is within the above range, a polypropylene-based resin including a block copolymer, in which the first polypropylene-based resin and the second polypropylene-based resin are chemically bonded, may be used.

The melting temperature of the polypropylene-based resin is further preferably 160° C. or higher, from the viewpoint of achieving both favorably fittability onto a rim and resistance to deformation during traveling. It is guessed that, by using a resin material having a melting temperature of 160° C. or higher, even though heat is generated at the time of traveling, stiffness can be provided, and owing to this, both favorably fittability onto a rim and resistance to deformation during traveling are achieved.

The melting temperature of the polypropylene-based resin can be measured as follows. Namely, in a case in which the resin material contains a resin other than the polypropylene-based resin or a component other than the resin, only the polypropylene-based resin is extracted from the resin material and the melting temperature can be measured according to the same method as the method for measuring the melting temperature of the resin material, which is described below.

(Additional Resin)

The resin material in the invention includes at least an olefin-based resin composition (preferably contains an olefin-based resin composition at a content exceeding 50% by mass), and may contain, as the residue, an additional resin other than the olefin-based resin composition or may contain a non-crystalline olefin resin, as long as the effects of the invention are not impaired. As the additional resin, a thermoplastic resin, a thermoplastic elastomer, or a rubber is preferable. Examples thereof include a polyamide-based resin, a polyurethane-based resin, a polyester-based resin, a polystyrene-based resin, a fluorine-containing resin, a polyamide-based thermoplastic elastomer, a polyester-based thermoplastic elastomer, a polyurethane-based thermoplastic elastomer, and a styrenic thermoplastic elastomer.

<Additives>

The resin material in the invention may contain, as desired, various additives. Examples of the additives include various additives such as rubber, various fillers (for example, silica, calcium carbonate, or clay), an aging inhibitor, an oil, a plasticizer, a coloring agent, a weatherproofing agent, or a reinforcing material.

Further, the resin material may contain, as the additive, rubber such as a hydrogenated styrene-butadiene rubber (HSBR), a styrene-butadiene rubber, an ethylene-propylene rubber, an isoprene rubber, a natural rubber, a chloroprene rubber, an acryl rubber, a chlorinated polyethylene rubber, or a fluorine-containing rubber.

The content of the additives in the resin material (tire frame) is not particularly limit, and the additives can be used as appropriate, as long as the effects of the invention are not impaired. In the case of adding a component other than the resin, such as an additive, to the resin material, the content of the resin component in the resin material is preferably higher than 50% by mass, and more preferably 90% by mass or higher, with respect to the total amount of the resin material. Here, the content of the resin component in the resin material indicates the residue obtained by subtracting the total content of the additives from the total amount of the resin components.

<Physical Properties of Resin Material>

Next, preferable physical properties of the resin material that constitutes the tire frame are explained. The tire frame in the invention is formed by using the resin material described above.

The resin material may be obtained by adding, if necessary, various additives to the resin containing the above-described olefin-based resin composition of a polypropylene-based resin or the like, and mixing them as appropriate, using a known method (for example, melt mixing).

The resin material obtained by melt mixing may be employed in a pellet form, if necessary.

In the invention, the content percentage of the olefin-based resin composition (including an acid modified body thereof) in the resin material is preferably higher than 50% by mass, and more preferably from 70% by mass to 100% by mass, with respect to the total amount of the resin material. When the content percentage of the olefin-based resin composition exceeds 50% by mass with respect to the total amount of the resin material, the properties of the olefin-based resin composition can be sufficiently exhibited, and the durability and productivity of the tire can be improved.

In the resin material, two or more kinds of olefin-based thermoplastic elastomers may be used, in order to adjust the elastic modulus and impact resistance.

The tensile elastic modulus in the resin material, which is measured in accordance with JIS K7113: 1995, is preferably from 100 MPa to 750 MPa, and more preferably from 140 MPa to 570 MPa, from the viewpoint of realizing favorable fittability onto a rim. When the tensile elastic modulus is within the above range, the shape of the tire frame can be favorably maintained, as compared with the case in which the tensile elastic modulus is lower than the above range. Further, when the tensile elastic modulus is within the above range, fitting onto a rim can be favorably carried out as compared with the case in which the tensile elastic modulus is higher than the above range, and leakage of the air in the inner part is suppressed.

From the viewpoint of suppressing deformation of the tire frame during traveling, the amount of creep of the resin material is preferably in a range of 50 mm or less, and the value closer to 0 mm, the more preferable. When the amount of creep is within the above range, even in a case in which a load is continuously applied to the tire through traveling, deformation of the tire frame itself is suppressed, and particularly, deformation at the side face of the tire is suppressed. As a result, also the leakage of the air in the inner part, which may occur in conjugation with this deformation of the tire frame itself, is suppressed.

The amount of creep of the resin material refers to the amount of creep after three hours, which is measured in accordance with JIS K7115 (1999), using a JIS No. 3 Dumbbell test specimen, under the conditions of a distance between the chucks of 65 mm, 40 kN, and 90° C.

Here, the tensile elastic modulus and the amount of creep are physical property values of the resin material, that is, physical property values of the tire frame to be formed of the resin material. Accordingly, even in a case in which the tire frame is formed of a resin material including other resin, in addition to the polypropylene-based resin, or in a case in which the tire frame is formed of a resin material including other additive other than the resin or the like, the tensile elastic modulus and the amount of creep indicate the physical properties of the resin material including all these components.

The melting temperature of the resin material containing the olefin-based resin composition is normally from 80° C. to 250° C., and from the viewpoint of productivity of the tire, the melting temperature is preferably from about 100° C. to about 200° C. As such, by using a resin material having a melting temperature of from 100° C. to 200° C., for example, in a case in which a frame of a tire is formed by welding together divided bodies thereof (frame pieces), the heating temperature of the weld portion can be set at a temperature equal to or higher than the melting temperature of the resin material that forms the tire frame.

In the tire of the invention, by using a resin material having a melting temperature within the above range, a sufficient strength of bonding of the tire frame pieces together is obtained even for a frame welded at a temperature within the range of from 100° C. to 200° C. Accordingly, the tire exhibits excellent durability during traveling, such as puncture resistance and abrasion resistance properties. The heating temperature is preferably a temperature that is from 10° C. to 150° C. higher, and is more preferably from 10° C. to 100° C. higher, than the melting temperature of the resin material that forms the tire frame pieces.

The melting temperature of the resin material refers to the temperature at which an endothermic peak is obtained, in the curve (DSC curve) obtained by differential scanning calorimetry (DSC).

Measurement of the melting temperature of the resin material is carried out in accordance with ASTMD3418-8, using a differential scanning calorimeter (DSC). Specifically, the resin material, which is the object to be measured, is placed in an aluminum pan, and besides, an empty pan is set for comparison, and measurement is carried out at a temperature elevating rate of 10° C./min. For the collection of temperature at the detection section of the measuring device, the melting temperatures of indium and zinc are used, and for the collection of heat quantity, the heat of fusion of indium is used.

The thermoplastic resin itself containing the olefin-based resin composition has a tensile yield strength as defined in JIS K7113:1995 of equal to or higher than 5 MPa, more preferably 5 MPa to 20 MPa, and still more preferably 5 MPa to 17 MPa. When the tensile yield strength of the resin material is equal to or higher than 5 MPa, resistance to deformation caused by a load applied to a tire during traveling or the like can be achieved.

The thermoplastic resin itself containing the olefin-based resin composition preferably has a tensile yield elongation as defined in JIS K7113:1995 of equal to or higher than 1%, more preferably 5% to 70%, and still more preferably 5% to 60%. When the tensile yield elongation of the resin material is equal to or higher than 5%, the elastic region is large, and fittability onto a rim is improved.

The thermoplastic resin itself containing the olefin-based resin composition preferably has a tensile elongation at break as defined in JIS K7113:1995 of equal to or higher than 50%, more preferably equal to or higher than 100%, still more preferably equal to or higher than 150%, and particularly preferably equal to or higher than 200%. When the tensile elongation at break of the resin material is equal to or higher than 50%, fittability onto a rim is excellent, and resistance to breaking at collision can be obtained.

The thermoplastic resin itself containing the olefin-based resin composition preferably has a deflection temperature under load (under a load of 0.45 MPa) as defined in ISO 75-2 or ASTM D648 of equal to or higher than 40° C., more preferably 40° C. to 150° C., and still more preferably 40° C. to 130° C. When the deflection temperature under load of the resin material is equal to or higher than 40° C., deformation of a tire frame can be suppressed even in cases in which vulcanization is performed during the production of a tire.

<Tire>

Embodiment 1

A tire according to Embodiment 1 in the invention will be described below with reference to the drawings.

Figure 1A:
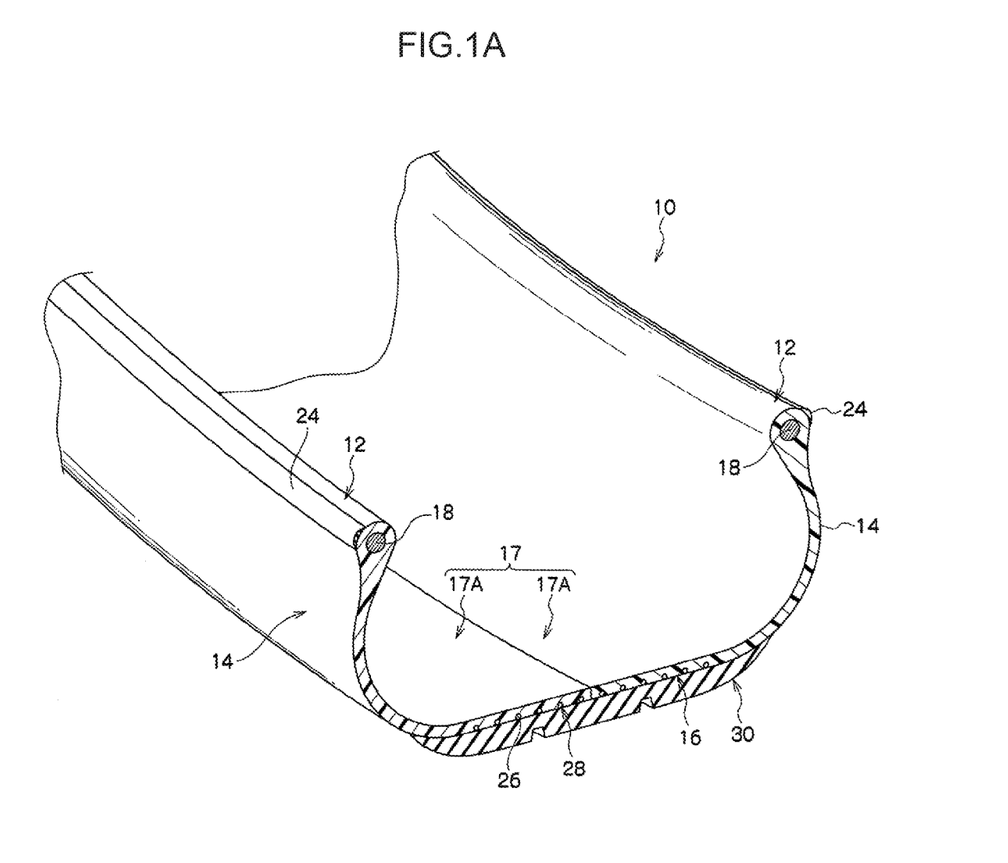
FIG. 1A is a perspective view illustrating a partial cross-section of a tire according to an embodiment of the present invention.
Figure 1B:
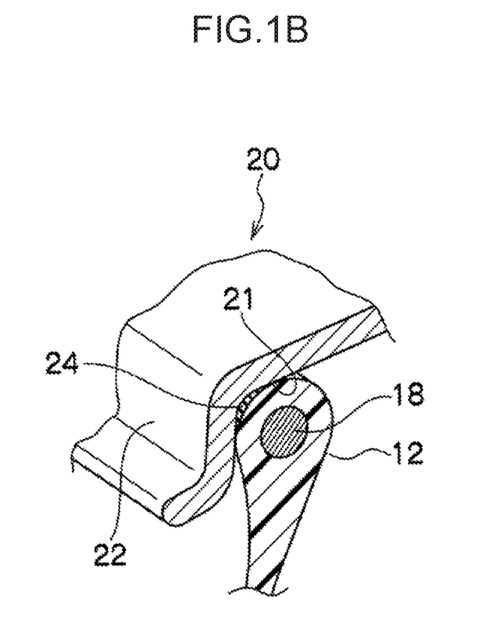
FIG. 1B is a cross-sectional view illustrating a bead portion of a tire fitted onto a rim.

A tire 10 according to this embodiment will be described below. FIG. 1A is a perspective view illustrating a cross-section of a part of a tire according to one embodiment of the invention. FIG. 1B is a cross-sectional view of a bead portion fitted to a rim. As shown in FIG. 1A, the tire 10 according to this embodiment has substantially the same cross-sectional shape as those of conventional general rubber pneumatic tires.

As shown in FIG. 1A, the tire 10 includes a tire case (tire frame) 17 composed of: a pair of bead portions 12 each contacting with a bead seat 21 and a rim flange 22 of a rim 20 shown in FIG. 1B; side portions 14 that extend from the bead portions 12 toward the outer side in the tire radial direction; and a crown portion 16 (outer peripheral portion) that connect the outer end in the tire radial direction of one side portion 14 and the outer end in the tire radial direction of the other side portion 14.

Here, in the tire case 17 of the present embodiment, a material which includes an olefin-based resin composition and has a tensile elastic modulus as defined in JIS K7113 (1995) of from 140 MPa to 570 MPa and an amount of creep as defined in JIS K7115 (1999) of 50 mm or less can be used as the resin material.

Further, in the tire case 17 of another embodiment of the invention, for example, a material which includes at least a polypropylene-based resin and is obtained by adding, if necessary, various additives to the polypropylene-based resin having a degree of crystallinity of from 24.5% to 32.7% can be used as the resin material.

The tire case 17 of the present embodiment is formed with a single resin material; however, the configuration of the invention is not limited thereto, and, similarly to ordinary conventional rubber-made pneumatic tires, resin materials with different characteristics may be employed for each of the sections of the tire case 17 (such as the side portions 14, the crown portion 16 and the bead portions 12). The tire case 17 may be reinforced by a reinforcing material by embedding the reinforcing material (such as fibers, cord, nonwoven fabric, or woven fabric of a polymer material or metal) in the tire case 17 (for example, in the bead portions 12, the side portions 14, the crown portion 16, and the like).

The tire case 17 according to the present embodiment is formed by bonding a pair of tire case half parts (tire frame pieces) 17A formed of a resin material to each other. The tire case half parts 17A is formed by placing circular tire case half parts 17A that have the same shape and that are obtained by molding one bead portion 12, one side portion 14, and a half-width of the crown portion 16 as an integral body by injection molding or the like, to face each other, and bonding the half parts to each other at the tire equatorial plane portion. The tire case 17 is not limited to that obtained by bonding two members, and may be formed by bonding three or more members.

Each tire case half part 17A formed of the resin material can be molded by, for example, vacuum molding, pressure molding, injection molding, or melt casting. Accordingly, when compared with a conventional case in which the tire case is molded from rubber, it is not necessary to perform vulcanization, as a result of which the production process can remarkably be simplified, and the molding time can be saved.

In the present embodiment, the tire case half parts 17A have a symmetric shape, that is, one tire case half part 17A and the other tire case half part 17A have the same shape; therefore, there is an advantage in that the tire case half parts 17A can be molded using only one type of mold.

In the present embodiment, as shown in FIG. 1B, an annular bead core 18 formed of a steel cord is embedded in each bead portion 12, similarly to conventional general pneumatic tire. However, the invention is not limited to this configuration; the bead core 18 may be omitted as long as the rigidity of the bead portions 12 is ensured and there is no problem in fitting to the rim 20. Other than the steel cord, the bead core may be formed of an organic fiber cord, a resin-coated organic fiber cord, a hard resin, or the like.

In the present embodiment, an annular sealing layer 24 formed of a material having higher sealing properties than those of the resin material constituting the tire case 17, for example rubber, is provided on a part of the bead portion 12 that contacts the rim 20 or at least on a part of the bead portion 12 that contacts the rim flange 22 of the rim 20. The sealing layer 24 may also be provided in a part in which the tire case 17 (the bead portion 12) and the bead seat 21 contact each other. A material softer than the resin material that constitutes the tire case 17 may be used as the material having higher sealing properties than those of the resin material that constitutes the tire case 17. It is preferable to use, as a rubber usable for the sealing layer 24, the same kind of rubber as a rubber used on the outer surface of a bead portion of a conventional general rubber pneumatic tire.

Other thermoplastic resins (thermoplastic elastomers) having higher sealing properties than those of the resin material may be used. Examples of other thermoplastic resins include resins such as a polyurethane-based resin, a polyolefin-based resin, a polystyrene-based thermoplastic resin, and a polyester resin, and a blend of any of these resins with a rubber or an elastomer (including a dynamic crosslinkable elastomer). Thermoplastic elastomers can also be used, and examples thereof include a polyester-based thermoplastic elastomer, a polyurethane-based thermoplastic elastomer, a polystyrene-based thermoplastic elastomer, and a polyolefin-based thermoplastic elastomer, and any combination of these elastomers and a blend of any of these elastomers with a rubber.

As shown in FIG. 1A, in the crown portion 16, a reinforcing cord 26 having higher rigidity than that of the resin material constituting the tire case 17 is wound in the circumferential direction of the tire case 17. The reinforcing cord 26 is helically wound to form a reinforcing cord layer 28 in a state in which at least a part of the reinforcing cord 26 is embedded in the crown portion 16 in a cross-sectional view taken along the axial direction of the tire case 17. A crown 30 formed of a material, such as rubber, having higher abrasion resistance than that of the resin material constituting the tire case 17 is disposed on the outer circumference side in the tire radial direction of the reinforcing cord layer 28.

Figure 2:
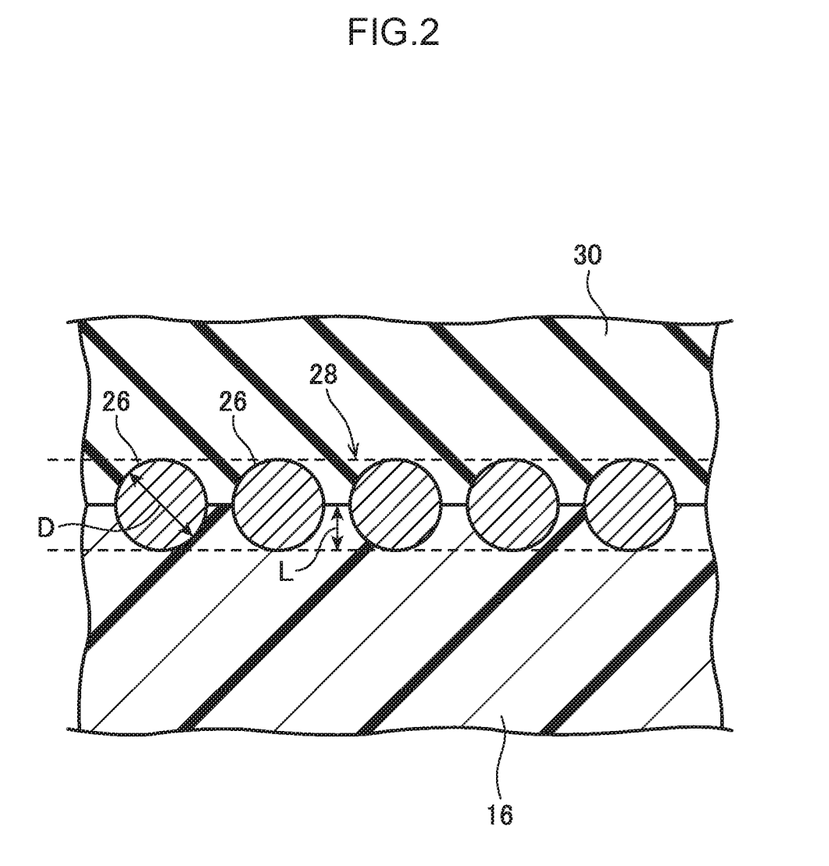
FIG. 2 is a cross-sectional view taken along a tire rotation axis, which illustrates a state where a reinforcing cord is embedded in a crown portion of a tire case of the tire according to the first embodiment of the present invention.

The reinforcing cord layer 28 formed by the reinforcing cord 26 will be described below with reference to FIG. 2. FIG. 2 is a cross-sectional view taken along the tire rotation axis, which illustrates a state in which the reinforcing cord is embedded in the crown portion of the tire case of the tire according to Embodiment 1. As shown in FIG. 2, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 specified by the dotted lines in FIG. 2. The part of the reinforcing cord 26 that is embedded in the crown portion 16 is in close contact with the resin material constituting the crown portion 16 (the tire case 17). A monofilament (single filament) of a metal fiber, an organic fiber, or the like, or a multifilament (stranded filament) in which fibers are stranded, such as a steel cord composed of steel fibers, may be used as the reinforcing cord 26. In the present embodiment, a steel cord is used as the reinforcing cord 26.

The embedding depth L in FIG. 2 represents the depth of embedding of the reinforcing cord 26 in the tire case 17 (the crown portion 16) in the tire rotation axis direction. The depth of embedding L of the reinforcing cord 26 in the crown portion 16 is preferably equal to or greater than ⅕ of the diameter D of the reinforcing cord 26, and more preferably more than ½ of the diameter D of the reinforcing cord 26. It is most preferable that the entire reinforcing cord 26 be embedded in the crown portion 16. When the depth of embedding L of the reinforcing cord 26 is more than ½ of the diameter D of the reinforcing cord 26, the reinforcing cord 26 is difficult to drop off from the embedded portion due to the dimensions of the reinforcing cord 26. When the reinforcing cord 26 is entirely embedded in the crown portion 16, the surface (the outer circumferential surface) becomes flat, whereby entry of air into an area around the reinforcing cord can be suppressed even when a member is placed on the crown portion 16 in which the reinforcing cord 26 is embedded. The reinforcing cord layer 28 corresponds to a belt disposed on the outer circumferential surface of a carcass of a conventional rubber pneumatic tire.

As described above, the crown 30 is disposed on the outer circumferential side in the tire radial direction of the reinforcing cord layer 28. It is preferable that the same kind of rubber as that used for conventional rubber pneumatic tires is used as the rubber used for the crown 30. It is also possible to use, instead of the crown 30, a crown formed of another kind of resin material which has higher abrasion resistance than that of the resin material constituting the tire case 17. In the crown 30, a crown pattern composed of plural grooves is formed on the contact surface that comes into contact with a road surface, similarly to conventional rubber pneumatic tires.

A method of producing a tire of the invention will be described below.

(Tire Case (Tire Frame) Forming Step)

First, tire case half parts are formed by using the resin material in the invention. It is preferable to form the tire case by injection molding. Next tire case half parts supported by thin metal support rings are arranged to face each other. Subsequently, a mold for bonding, which is not shown in the drawings, is placed so as to contact the outer circumferential surface of a portion at which the tire case half parts are contacted with each other. Here, the mold for bonding is configured to pressurize a region at or around the bonding section (the contact portion) of the tire case half parts 17A with a predetermined pressure. Then, the region at or around the bonding section of the tire case half parts is pressurized at a temperature equal to or higher than the melting temperature (or the softening temperature) of the resin material that constitutes the tire case. When the bonding section of the tire case half parts is heated and pressurized by the mold for bonding, the bonding section is melted, and the tire case half parts are fused with each other, as a result of which the members are integrated to form the tire case 17. Although the bonding section of the tire case half parts is heated using the mold for bonding in the present embodiment, the invention is not limited to this configuration; heating of the bonding section may be carried out using, for example, a separately-provided high-frequency heater, or the tire case half parts may be bonded by softening or melting the bonding section, in advance, via application of hot air, irradiation of infrared rays or the like, and pressurizing the bonding section using the mold for bonding.

(Reinforcing Cord Member Winding Step)

Figure 3:
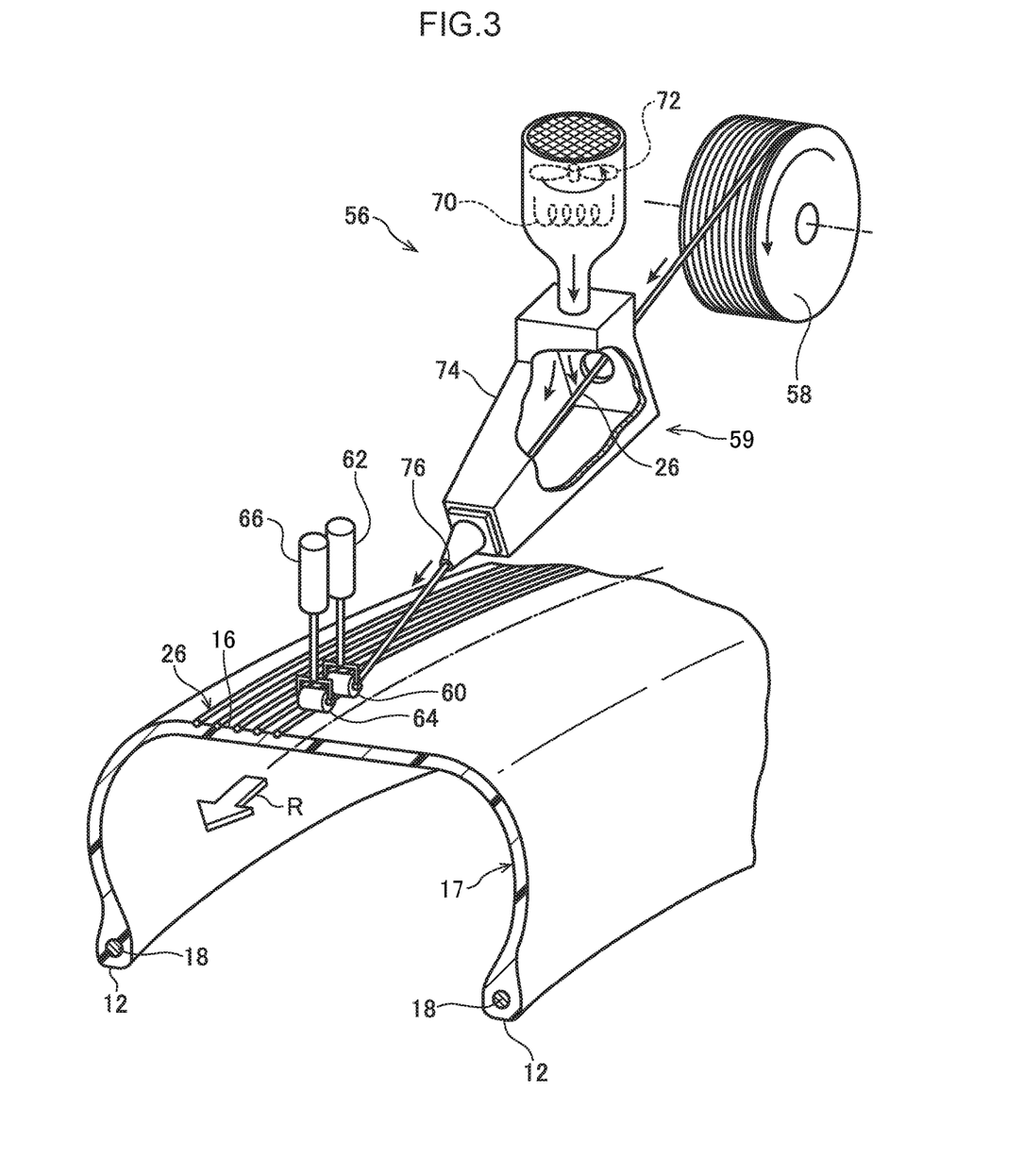
FIG. 3 is a diagram illustrating an operation of embedding the reinforcing cord in the crown portion of the tire case by the use of a cord heating apparatus and rollers.

Next, a reinforcing cord winding step will be described below using FIG. 3. FIG. 3 is an explanatory diagram explaining an operation of embedding the reinforcing cord in the crown portion of the tire case using a cord heating device and rollers. In FIG. 3, a cord feeding apparatus 56 includes a reel 58 on which a reinforcing cord 26 is wound, a cord heating device 59 disposed at the downstream side in the cord feeding direction of the reel 58, a first roller 60 disposed at the downstream side in the reinforcing cord 26 feeding direction, a first cylinder unit 62 for moving the first roller 60 in directions in which the first roller comes into contact with and get away from the outer circumferential surface of the tire, a second roller 64 disposed at the downstream side in the reinforcing cord 26 feeding direction of the first roller 60, and a second cylinder unit 66 for moving the second roller 64 in directions in which the first roller comes into contact with and get away from the outer circumferential surface of the tire. The second roller 64 can be used as a cooling roller formed of metal. In the present embodiment, the surface of the first roller 60 or the second roller 64 is coated with a fluororesin (TEFLON (registered trademark) in the case of the present embodiment) with a view to suppressing adhesion of the melted or softened resin material. Although the cord feeding apparatus 56 is configured to have two rollers of the first roller 60 and the second roller 64 in the present embodiment, the invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and an discharge port 76 through which the heated reinforcing cord 26 is discharged.

In this step, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74 of which the inner space is heated with hot air, whereby the reinforcing cord 25 is heated (for example, to increase the temperature of the reinforcing cord 26 to be about 100° C. to about 200° C.). The heated reinforcing cord 26 passes through the discharge port 76, and is helically wound, with a constant tension, around the outer circumferential surface of the crown portion 16 of the tire case 17 rotating in the direction of arrow R in FIG. 3. Here, as a result of the heated reinforcing cord 26 coming into contact with the outer circumferential surface of the crown portion 16, the resin material at the contact portion is melted or softened, and at least a part of the heated reinforcing cord 26 is embedded in the outer circumferential surface of the crown portion 16. In this process, since the heated reinforcing cord 26 is embedded in the melted or softened resin material, the resin material and the reinforcing cord 26 get into a state in which no space is left between the resin material and the reinforcing cord 26, that is, in a tightly-contacted state. Accordingly, the incorporation of air into the portion in which the reinforcing cord 26 is embedded is suppressed. By heating the reinforcing cord 26 to a temperature higher than the melting temperature (or the softening temperature) of the resin material of the tire case 17, the melting or softening of the resin material in the portion contacting the reinforcing cord 26 is promoted. By employing this configuration, embedding of the reinforcing cord 26 in the outer circumferential surface of the crown portion 16 is facilitated, and the incorporation of air can effectively be suppressed.

The depth L of embedding of the reinforcing cord 26 can be adjusted by the heating temperature for the reinforcing cord 26, the tension applied to the reinforcing cord 26, the pressure applied from the first roller 60, etc. In the present embodiment, the depth L of embedding of the reinforcing cord 26 is set to be equal to or greater than ⅕ of the diameter D of the reinforcing cord 26. The depth L of embedding of the reinforcing cord 26 is more preferably more than ½ of the diameter D, and it is still more preferable that the entire reinforcing cord 26 is embedded.

In this way, a reinforcing cord layer 28 is formed on the outer circumference side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

A belt-shaped vulcanized crown 30 is wound on the outer circumferential surface of the tire case 17 for one revolution, and the crown 30 is bonded to the outer circumferential surface of the tire case 17 using, for example, an adhesive. For example, precured crown known thus far for use in retreaded tires may be used as the crown 30. This step is a step similar to a step of bonding a precured crown to the outer circumferential surface of a casing of a retreaded tire.

A tire 10 can be completed by bonding a sealing layer 24 formed of a vulcanized rubber to the bead portion 12 of the tire case 17 using, for example, an adhesive.

(Effects)

In the tire 10 of the present embodiment, the tire case 17 is formed of a resin material, which includes an olefin-based resin composition and has a tensile elastic modulus as defined in JIS K7113 (1995) of from 140 MPa to 570 MPa and an amount of creep as defined in JIS K7115 (1999) of 50 mm or less. Therefore, the tire can achieve both favorable fittability onto a rim and favorable resistance to deformation during traveling.

In the tire 10 of another embodiment of the invention, the tire case 17 is formed of a resin material including a polypropylene-based resin having a degree of crystallinity of from 24.5% to 32.7%. Therefore, the tire can achieve both favorable fittability onto a rim and resistance to deformation during traveling.

Further, the tire 10 has a simpler structure as compared with conventional tires made of rubber, and is hence lighter in weight. Accordingly, the tire 10 of the embodiments of the invention has high friction resistance and high durability. Moreover, since the tire case 17 can be produced by injection molding, the productivity is also extremely excellent.

In addition, in the tire 10 of the embodiment, since the reinforcing cord 26 having a higher stiffness than the resin material is wound in a spiral shape in the circumferential direction on the outer circumferential surface of the crown portion 16 in the tire case 17 formed of the resin material, the puncture resistance, the cutting resistance and the stiffness of the tire 10 in the circumferential direction are improved. Meanwhile, the improvement of the stiffness of the tire 10 in the circumferential direction prevents the creeping in the tire case 17 formed of the resin material.

In a cross-sectional view taken along the axial direction of the tire case 17 (the cross-section shown in FIG. 1A), at least a part of the reinforcing cord 26 is embedded in the outer circumferential surface of the crown portion 16 of the tire case 17 formed of the resin material, and is in close contact with the resin material, as a result of which incorporation of air during production is suppressed, and movement of the reinforcing cord 26 due to, for example, a force applied at the time of traveling is suppressed. Accordingly, separation between the reinforcing cord 26, the tire case 17, and the crown 30 is suppressed, and the durability of the tire 10 is improved.

In a case in which the reinforcing cord layer 28 is configured to include the resin material as described above, the reinforcing cord 26 can be made to more tightly contact the tire case 17 and fixed to the tire case 17 since the difference in hardness between the tire case 17 and the reinforcing cord layer 28 can be made smaller than that in a case in which the reinforcing cord 26 is fixed using a cushion rubber. Accordingly, the incorporation of air mentioned above can effectively be prevented, and the movement of the reinforcing cord member at the time of traveling can effectively be suppressed.

In a case in which the reinforcing cord 26 is a steel cord, the reinforcing cord 26 can easily be separated from the resin material by heating and recovered at the time of disposing of the tire, and, therefore, there is an advantage from the viewpoint of recyclability of the tire 10. Further, since the resin material has a lower loss factor (tan δ) compared with vulcanized rubbers, inclusion of a large amount of the resin material in the reinforcing cord layer 28 makes it possible to enhance the rolling properties of the tire. Compared with vulcanized rubbers, the resin material has advantages in terms of high in-plane shear stiffness, excellent steering stability at the time of traveling with the tire, and excellent abrasion resistance.

In addition, since the depth L of embedding of the reinforcing cord 26 is equal to or greater than ⅕ of the diameter D as illustrated in FIG. 2, incorporation of air during manufacturing is effectively suppressed, and the movement of the reinforcing cord 26 due to input power or the like while travelling is further suppressed.

Since the crown 30 that contacts a road surface is formed of a rubber material having higher abrasion resistance than that of the resin material constituting the tire case 17, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber pneumatic tires.

By providing a sealing layer 24, which is formed of a rubber material having higher sealing properties than those of the resin material constituting the tire case 17, on a part of the bead portion 12 that contacts the rim 20, the rim fittability between the tire 10 and the rim 20 can be further enhanced.

Although a configuration in which the reinforcing cord 26 is heated such that the polyamide-based thermoplastic elastomer in a portion that contacts the heated reinforcing cord 26 is melted or softened is adopted in the embodiment described above, the invention is not limited to this configuration; a hot air generating device may be used, instead of heating the reinforcing cord 26, to heat the outer circumferential surface of the crown portion 16 in which the reinforcing cord 26 is to be embedded, and the reinforcing cord 26 may thereafter be embedded in the crown portion 16.

Although the heat source of the cord heating device 59 includes the heater and the fan in Embodiment 1, the invention is not limited to this configuration, and a configuration in which the reinforcing cord 26 is directly heated by radiation heat (for example, infrared rays) may be adopted.

Although a configuration in which a region at which the resin material with the reinforcing cord 26 embedded therein is melted or softened is forcibly cooled with the second roller 64 formed of metal is adopted in Embodiment 1, the invention is not limited to this configuration; a configuration in which cold air is directly applied to the region at which the resin material is melted or softened, to forcibly cool and solidify the region at which the resin material is melted or softened may also be adopted.

Although a configuration in which the reinforcing cord 26 is heated is adopted in Embodiment 1, a configuration in which the outer circumference of the reinforcing cord 26 is coated with the same resin material as that of the tire case 17, for example, may be adopted. In this case, by heating the coated resin material along with the reinforcing cord 26 when the coated reinforcing cord is wound on the crown portion 16 of the tire case 17, incorporation of air can effectively be suppressed at the time of embedding the reinforcing cord in the crown portion 16.

Helically winding the reinforcing cord 26 is easy from the viewpoint of production. However, a method in which the reinforcing cord 26 is discontinuous in the width direction, for example, may also be contemplated.

The tire 10 of Embodiment 1 is a so-called tubeless tire, in which an air chamber is formed between the tire 10 and the rim 20 when the bead portion 12 is fitted onto the rim 20. However, the invention is not limited to this configuration, and the tire may have a complete tube form. Further, the tire of the invention may have a mode in which a reinforcing cord member is used, the cord member being covered with a resin material, as shown in the second embodiment (FIG. 4 and FIG. 5) of JP-A No. 2012-46030.

Although modes for carrying out the invention are described above with reference to embodiments, the embodiments are merely examples, and may be practiced with various modifications within a range that does not depart from the gist of the invention. Of course, the protection scope of the invention is not limited to these embodiments.

EXAMPLES

More specific explanation regarding the invention is given below based on Examples. However the invention is not limited thereto.

Examples 1 to 7 and Comparative Examples 1 to 9

The materials described in Table 1 were mixed according to the composition described in the table, thereby obtaining a resin material. In this process, mixing was carried out using a twin-screw extruder as the mixing device, and kneading was carried out at a temperature of from 180° C. to 230° C.

The resin material thus obtained was pelletized and subjected to injection molding at a temperature of from 180° C. to 230° C., to obtain a sample piece. With the exception of the Resistance to Deformation, Fittability on Rim and Impact Resistance, measurements were carried out using a specimen produced by punching a test piece from this sample piece. The Resistance to Deformation, Fittability on Rim and Impact Resistance is evaluated.

The resin materials obtained in Example 5 and Comparative Example 8 were observed by an atomic force microscope (AFM) and, as a result, it was confirmed that each of the resin materials has a sea-island structure including a sea part (continuous phase) formed of the first polypropylene-based resin and an island part (dispersed phase) formed of the second polypropylene-based resin.

—Evaluation—

Tensile Elastic Modulus

Measurement was carried out in accordance with JIS K7113 (1995).

Amount of Creep

The amount of creep after three hours was measured in accordance with JIS K7115 (1999), using a JIS No. 3 Dumbbell test specimen, under the conditions of a distance between the chucks of 65 mm, 40N, and 90° C.

Degree of Crystallinity

Using a differential scanning calorimetric analysis (DSC) device [trade name: Q2000, manufactured by TA Instruments], the heat quantity of fusion was measured while elevating the temperature of the pellet shaped specimen from −60° C. to 220° C. at a temperature elevating rate of 10° C./min, and the degree of crystallinity was calculated.

Melting Temperature

Measurement was carried out in accordance with ASTMD3418-8, using a differential scanning calorimeter DSC manufactured by TA Instruments.

Evaluation of Tire (Resistance to Deformation)

A tire of 165/45 R16 is prepared, and the tire is allowed to run at a speed of 150 km/h, using a drum. The tire which runs for 5 minutes or more is evaluated as "A", and the tire in which the side face gets swollen, or the tire in which leakage of air is caused by this swelling of the side face is evaluated as "B".

Evaluation of Tire (Fittability onto Rim)

Using each of the resin materials obtained in Examples and Comparative Examples, a tire is formed by referring to the first embodiment described above. Subsequently, the tire is mounted on a rim. The case in which air sealing property can be ensured is evaluated as "A", and the case in which air sealing property cannot be ensured is evaluated as "B".

Impact Resistance

A Charpy test at −30° C. (JIS K7111-1: 2006) is carried out in the un-notched condition. The specimen that is broken is evaluated as "B", and the specimen that is not broken is evaluated as "NB".

The results of the above evaluations is shown in Table 1 below.

TABLE 1

| | | C. Ex. 1 | C. Ex. 2 | Exp. 1 | Exp. 2 | C. Ex. 3 | C. Ex. 4 | C. Ex. 5 | Exp. 3 | Exp. 4 |
|---|---|---|---|---|---|---|---|---|---|---|
| First polypropylene-based resin | E105GM EA9 | 100 | 70 | 60 | 50 | 40 | 100 | 70 | 60 | 50 |
| Second polypropylene-based resin | PS522M PN-3560 | | 30 | 40 | 50 | 60 | | 30 | 40 | 50 |
| Mixed polypropylene-based resin | T1712 | | | | | | | | | |
| Evaluation | Elastic Modulus [MPa] | 1637 | 750 | 558 | 300 | 194 | 1631 | 820 | 555 | 421 |
| | Amount of Creep [mm] | 0.7 | 1.2 | 3.1 | 19.8 | 121.4 | 0.5 | 1.5 | 3.2 | 26 |
| | Degree of Crystallinity [%] | 43 | 33.9 | 28.7 | 27.5 | 24 | 41 | | | |
| | Melting Temperature [° C.] | 163.7 | 163.3 | 162 | 162.1 | 162.1 | 161.2 | 160.8 | 160.5 | 160.7 |
| | Resistance to Deformation | A | A | A | A | B | A | A | A | A |
| | Fittability onto Rim | B | B | A | A | A | B | B | A | A |
| | Impact Resistance | B | B | NB | NB | B | B | B | NB | NB |

| | | C. Ex. 6 | C. Ex. 7 | C. Ex. 8 | Exp. 5 | Exp. 6 | Exp. 7 | C. Ex. 9 |
|---|---|---|---|---|---|---|---|---|
| First polypropylene-based resin | E105GM EA9 | | | | 70 | 65 | 60 | 55 | 50 |
| Second polypropylene-based resin | PS522M PN-3560 | | 100 | 60 40 | | | | |
| Mixed polypropylene-based resin | T1712 | | | | 30 | 35 | 40 | 45 | 50 |
| Evaluation | Elastic Modulus [MPa] | 1421 | 480 | 809 | 554 | 410 | 328 | 247 |
| | Amount of Creep [mm] | 1.2 | 137.1 | 1.6 | 2.7 | 3.8 | 29.1 | 57.4 |
| | Degree of Crystallinity [%] | | | | | | | |
| | Melting Temperature [° C.] | 149 | 154.7 | 163.47 | 162.3 | 162 | 162.1 | 161.8 |
| | Resistance to Deformation | A | B | A | A | A | A | B |
| | Fittability onto Rim | B | A | B | A | A | A | A |
| | Impact Resistance | B | B | B | NB | NB | NB | B |

In table 1, the abbreviation "C. Ex." represents "Comparative Example Number", and the abbreviation "Exp." represents "Example Number".

The components shown in Table 1 above are as follows.

E105GM: isotactic polypropylene; "PRIME POLYPRO", manufactured by Prime Polymer Co., Ltd.; weight average molecular weight: 1,220,000

EA9: isotactic polypropylene; "NOVATEC (registered trademark)", manufactured by Japan Polypropylene Corporation; weight average molecular weight: 1,120,000

PS522M: random copolymer of propylene and ethylene; manufactured by SunAllomer Ltd.; proportion of the constituent units derived from propylene to the total of the constituent units that constitute the main chain: 96% by mass, weight average molecular weight: 539,000

PN-3560: block copolymer of propylene, ethylene, and 1-butene; "TAFMER (registered trademark)", manufactured by Mitsui Chemicals, Inc.; proportion of the constituent units derived from propylene to the total of the constituent units that constitute the main chain: 71% by mass, proportion of the constituent units derived from 1-butene to the total of the constituent units that constitute the main chain: 21% by mass, weight average molecular weight: 390,000, Shore A hardness: 70

T1712: mixture of atactic polypropylene and isotactic polypropylene; "TAFTHREN (registered trademark)", manufactured by Sumitomo Chemical Co., Ltd., content of atactic polypropylene: 85% by mass, weight average molecular weight: 561,000, Duro A hardness: 61

Examples B1 to B3 and Comparative Examples B1 to B5

The resin material described in Table 1 was subjected to injection molding at a temperature of from 180° C. to 230° C., to obtain a sample piece. With the exception of the Resistance to Deformation, Fittability on Rim and Impact Resistance, measurements were carried out using a specimen produced by punching a test piece from this sample piece. The Resistance to Deformation, Fittability on Rim and Impact Resistance is evaluated.

Examples B4 to B12

The resin materials described in [Table B1 to Table B3] were mixed according to the composition described in the tables, using a twin-screw extruder at a temperature of from 180° C. to 230° C., to obtain a resin material. The resin material thus obtained was pelletized and subjected to injection molding at a temperature of from 180° C. to 230° C., to obtain a sample piece. With the exception of the Resistance to Deformation, Fittability on Rim and Impact Resistance, measurements were carried out using a specimen produced by punching a test piece from this sample piece. The Resistance to Deformation, Fittability on Rim and Impact Resistance is evaluated.

Tensile Elastic Modulus

Measurement was carried out in accordance with JIS K7113 (1995).

Amount of Creep

The amount of creep after three hours was measured in accordance with JIS K7115 (1999), using a JIS No. 3 Dumbbell test specimen, under the conditions of a distance between the chucks of 65 mm, 40 kN, and 90° C.

—Evaluation—

Evaluation of Tire (Resistance to Deformation)

A tire of 165/45 R16 is prepared, and the tire is allowed to run at a speed of 150 km/h, using a drum. The tire which runs for 5 minutes or more is evaluated as "A", and the tire in which the side face gets swollen, or the tire in which leakage of air is caused by this swelling of the side face is evaluated as "B".

Evaluation of Tire (Fittability onto Rim)

Using each of the resin materials obtained in Examples and Comparative Examples, a tire is formed by referring to the first embodiment described above. Subsequently, the tire is mounted on a rim. The case in which air sealing property can be ensured is evaluated as "A", and the case in which air sealing property cannot be ensured is evaluated as "B".

Impact Resistance

A Charpy test at −30° C. (JIS K7111-1: 2006) is carried out in the un-notched condition. The specimen that is broken is evaluated as "B", and the specimen that has not broken is evaluated as "NB".

The results of the above evaluations is shown in Table B1 to Table B3 below.

TABLE B1

| | Example | | | Comparative Example | | | | |
| --- | --- | --- | --- | --- | --- | --- | --- | --- |
| | B1 | B2 | B3 | B1 | B2 | B3 | B4 | B5 |
| Resin Materials | 1520F | 1540F | PE UF230 | 4540F | 613A | J-5710 | PP E-105GM | EA9 |
| Elastic Modulus [MPa] | 163 | 144 | 342 | 809 | 189 | 345 | 1032 | 1631 |
| Amount of Creep [mm] | 21 | 15.2 | 9.4 | 3.63 | | | 0.7 | 0.9 |
| Mw | 213,369 | 188,700 | 278,300 | 199,397 | 92,000 | 317,000 | 1,223,000 | 1,120,000 |
| Resistance to Deformation | A | A | A | A | B | B | A | A |
| Fittability onto Rim | A | A | A | B | A | A | B | B |
| Impact Resistance | NB | NB | NB | B | NB | B | B | B |

The components shown in Table B1 above are as follows.

1520F: polyethylene, "UMERIT (registered trademark)", manufactured by Ube-Maruzen Polyethylene Co., Ltd.

1540F: polyethylene, "UMERIT (registered trademark)", manufactured by Ube-Maruzen Polyethylene Co., Ltd.

UF230: polyethylene; "NOVATEC (registered trademark)", manufactured by Japan Polyethylene Corporation 4540F: polyethylene, "UMERIT (registered trademark)", manufactured by Ube-Maruzen Polyethylene Co., Ltd.

613A: polyethylene, "UMERIT (registered trademark)", manufactured by Ube-Maruzen Polyethylene Co., Ltd.

J-5710: polypropylene; "PRIME TPO (registered trademark)", manufactured by Prime Polymer Co., Ltd.

E-105GM: polypropylene; "PRIME POLYPRO", manufactured by Prime Polymer Co., Ltd.

EA9: polypropylene; "NOVATEC (registered trademark)", manufactured by Japan Polypropylene Corporation

TABLE B2

|  |  | Example | | |
|---|---|---|---|---|
|  |  | B4 | B5 | B6 |
| Resin | 1540F | 70 | 76.2 | 60 |
| Materials | LP91 | 30 | 9.5 | |
|  | 1022B | | 9.5 | 40 |
|  | NE605 | | 4.8 | |
|  | (Unit: parts by mass) | | | |
| Elastic Modulus [MPa] | | 191 | 251 | 558 |
| Amount of Creep [mm] | | 20 | 18 | 3.1 |
| Resistance to Deformation | | A | A | A |
| Fittability onto Rim | | A | A | A |
| Impact Resistance | | NB | NB | NB |

TABLE B3

|  |  | Example | | | | | |
|---|---|---|---|---|---|---|---|
|  |  | B7 | B8 | B9 | B10 | B11 | B12 |
| Resin | E-150GM | 60 | 50 | 60 | 70 | | |
| Materials | EA9 | | | | | 60 | 50 |
|  | PN-3560 | | 50 | | | 40 | 50 |
|  | T1712 | 40 | | | | | |
|  | P-0375 | | | 40 | | | |
|  | 1320P | | | | 30 | | |
|  | (Unit: parts by mass) | | | | | | |
| Elastic Modulus [MPa] | | 554 | 300 | 568 | 453 | 555 | 421 |
| Amount of Creep [mm] | | 2.7 | 49.8 | 28.6 | 6.7 | 3.2 | 26 |
| Resistance to Deformation | | A | A | A | A | A | A |
| Fittability onto Rim | | A | A | A | A | A | A |
| Impact Resistance | | B | B | B | B | B | B |

The components shown in Table B2 and Table B3 above are as follows.

1540F: polyethylene; "UMERIT (registered trademark)", manufactured by Ube-Maruzen Polyethylene Co., Ltd.

LP91: modified polyolefin; "APOLHYA (registered trademark)", manufactured by Arkema Inc.

1022B: polyamide 6; "UBE NYLON", manufactured by Ube Industries, Ltd.

NE605: acid modified polyethylene; "ADMER (registered trademark)", manufactured by Mitsui Chemicals, Inc.

E-105GM: polypropylene; "PRIME POLYPRO", manufactured by Prime Polymer Co., Ltd.

EA9: polypropylene; "NOVATEC (registered trademark)", manufactured by Japan Polypropylene Corporation PN-3560: crystalline olefin elastomer; "TAFMER (registered trademark)", manufactured by Mitsui Chemicals, Inc.

T1712: atactic polypropylene; "TAFTHREN (registered trademark)", manufactured by Sumitomo Chemical Co., Ltd.

P-0375: polyethylene/polypropylene copolymer; "TAFMER (registered trademark)", manufactured by Mitsui Chemicals, Inc.

1320P: HSBR; "DYNARON (registered trademark)", manufactured by JSR Corporation

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

This application claims priority from Japanese Patent Application No. 2015-020549, filed on Feb. 4, 2015, and Japanese Patent Application No. 2015-020562, Feb. 4, 2015, the disclosures of which are incorporated by reference herein.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A tire, comprising a circular tire frame formed from a resin material, the resin material comprising an olefin-based resin composition and having a tensile elastic modulus as defined in JIS K7113 (1995) of from 140 MPa to 570 MPa and an amount of creep as defined in JIS K7115 (1999) of 50 mm or less.

2. The tire according to claim 1, wherein the resin material comprises at least a polypropylene-based resin, a degree of crystallinity of the polypropylene-based resin being from 24.5% to 32.7%.

3. The tire according to claim 2, wherein a content of the polypropylene-based resin in the resin material is higher than 60% by mass.

4. The tire according to claim 2, wherein a melting temperature of the polypropylene-based resin is 160° C. or higher.

5. The tire according to claim 2, wherein the polypropylene-based resin is a mixture including a first polypropylene-based resin and a second polypropylene-based resin that is different from the first polypropylene-based resin.

6. The tire according to claim 5, wherein the mixture is a substance in which the second polypropylene-based resin is dispersed as a dispersed phase in a continuous phase including the first polypropylene-based resin.

7. The tire according to claim 5, wherein a proportion of constituent units derived from propylene with respect to a total of constituent units that constitute a main chain of the second polypropylene-based resin is from 50% by mass to 100% by mass.

8. The tire according to claim 5, wherein a content of the second polypropylene-based resin with respect to a total amount of the first polypropylene-based resin and the second polypropylene-based resin is from 34% by mass to 50% by mass.

9. The tire according to claim 1, wherein the olefin-based resin composition is an ethylene-based resin composition.

10. The tire according to claim 9, wherein a weight average molecular weight of the ethylene-based resin composition is from 100,000 to 300,000.

11. The tire according to claim 10, wherein the weight average molecular weight of the ethylene-based resin composition is from 180,000 to 300,000.

12. The tire according to any one of claim 1, wherein the resin material contains the olefin-based resin composition at a content of higher than 50% by mass.

13. The tire according to claim 3, wherein a melting temperature of the polypropylene-based resin is 160° C. or higher.

14. The tire according to claim 3, wherein the polypropylene-based resin is a mixture including a first polypropylene-based resin and a second polypropylene-based resin that is different from the first polypropylene-based resin.

15. The tire according to any one of claim 9, wherein the resin material contains the olefin-based resin composition at a content of higher than 50% by mass.

16. The tire according to claim 4, wherein the polypropylene-based resin is a mixture including a first polypropylene-based resin and a second polypropylene-based resin that is different from the first polypropylene-based resin.

17. The tire according to claim 13, wherein the polypropylene-based resin is a mixture including a first polypropylene-based resin and a second polypropylene-based resin that is different from the first polypropylene-based resin.

18. The tire according to claim 14, wherein the mixture is a substance in which the second polypropylene-based resin is dispersed as a dispersed phase in a continuous phase including the first polypropylene-based resin.

19. The tire according to claim 14, wherein a proportion of constituent units derived from propylene with respect to a total of constituent units that constitute a main chain of the second polypropylene-based resin is from 50% by mass to 100% by mass.

20. The tire according to claim 14, wherein a content of the second polypropylene-based resin with respect to a total amount of the first polypropylene-based resin and the second polypropylene-based resin is from 34% by mass to 50% by mass.

21. The tire according to claim 1, wherein the resin material has a tensile elastic modulus as defined in JIS K7113 (1995) of from 160 MPa to 500 MPa.

22. The tire according to claim 1, wherein the resin material has an amount of creep as defined in JIS K7115 (1999) of from 2.7 mm to 50 mm.

* * * * *